United States Patent [19]
Portilla

[11] Patent Number: 5,380,029
[45] Date of Patent: Jan. 10, 1995

[54] CARRIER FOR TRANSPORTING GOODS

[76] Inventor: Mario Portilla, 28 Lombard Dr., West Caldwell, N.J. 07006

[21] Appl. No.: 153,045

[22] Filed: Nov. 17, 1993

[51] Int. Cl.⁶ .......................... B60P 3/42; B60G 9/02
[52] U.S. Cl. .............. 280/414.5; 280/418.1; 280/43.17; 280/DIG. 8
[58] Field of Search ............ 280/414.50, 405.1, 415.1, 280/418.1, 43, 43.12, 43.17, 43.23, DIG. 8, 423.1

[56] References Cited

U.S. PATENT DOCUMENTS

| | | | |
|---|---|---|---|
| 3,156,484 | 11/1964 | Talbert | 280/43.23 |
| 3,193,301 | 7/1965 | Talbert et al. | 280/43.23 |
| 3,570,694 | 3/1971 | Tantlinger | 414/458 |
| 3,788,683 | 1/1974 | Rumell | 410/66 |
| 4,231,709 | 11/1980 | Corsetti | 414/458 |
| 5,050,897 | 9/1991 | Strömberg | 280/43 |

FOREIGN PATENT DOCUMENTS

| | | | |
|---|---|---|---|
| 861968 | 11/1952 | Germany | 280/43 |
| 1047032 | 12/1958 | Germany | 280/418.1 |
| 8902388 | 3/1989 | WIPO | 280/418.1 |

Primary Examiner—Kenneth R. Rice
Assistant Examiner—Kevin Hurley
Attorney, Agent, or Firm—Thomas L. Adams

[57] ABSTRACT

A carrier for transporting goods has a compartment adapted to hold goods. A crane is peripherally mounted near the underside of the compartment for articulating about a pivot axis between an upright position and a level position. The carrier has a carriage with a plurality of wheels. The carriage is adapted to slide under the compartment and on the crane. The carrier has an actuating controller for: (a) sliding the carriage between the compartment and the crane; and (b) hoisting and lowering the carriage with the crane. The system can operate by first lowering the crane to a level position. Then the carriage can be slid from underneath the compartment to a position suspended on the crane. Then the crane is articulated to an upright position to lift the carriage up against the compartment. The steps can also be reversed to bring the carriage back underneath the compartment.

29 Claims, 5 Drawing Sheets

CARRIER FOR TRANSPORTING GOODS

BACKGROUND OF THE INVENTION

1. Field of the Invention

The present invention relates to containers, trailers or other carriers for transporting goods and having a carriage with wheels that can be moved from underneath the compartment to another position.

2. Description of Related Art

Goods are often transported by trailer or in a container. Containers may be loaded onto on a separate trailer having a flat bed and transported by a truck tractor. The container can also be hoisted off the trailer and loaded onto another carrier such as a cargo ship (and vice versa). A disadvantage with having a container separate from the trailer bed is the high capital cost involved with keeping and maintaining the separate trailers. Also, much time is spent coordinating and moving the trailers so that they can be brought together with a container. Furthermore, when not in use, these trailers take up significant real estate.

In principle, a trailer having a compartment and underlying wheels could be hoisted together onto or off a cargo ship. Unfortunately however, the wheel carriage wastes valuable space, because it effectively raises the compartment some five feet off any loading surface. Thus trailers with wheels cannot be efficiently stacked and loaded.

In U.S. Pat. No. 3,156,484 a wheel assembly is connected through one hydraulic cylinder to the top rear corner of a container and through another hydraulic cylinder to a the side of the container, near the bottom edge. One hydraulic cylinder can slide the wheel assembly from underneath the container, while the other cylinder can lower the container. When the container is lowered, the wheel assembly tilts up at about 45° and does not lay flat against the back of the container. Thus this wheel assembly is not designed to be shipped width the container is specifically described as being removed after the container is lowered.

U.S. Pat. No. 5,050,897 shows a set of wheels that swing on a pivot point from a deployed position underneath the trailer to a stored position inside the trailer body. This structure effectively extends the length of the trailer by adding unusable space that is dedicated to wheel storage, not cargo storage.

U.S. Pat. No. 3,193,301 shows a transporter assembly that can lift a unit by swinging in about a pivot point at the upper edge of the unit. Again, this structure shows wheels that retract, but do not store compactly and would not be shipped with the unit. See also U.S. Pat. Nos. 3,570,694 and 4,321,709.

U.S. Pat. No. 3,788,683 shows dolly wheels that are deployed from cavities on the underside of a container, but this structure would not be useful for highway transportation. Moreover, the space needed for the stored dolly wheels will create an obstruction in the container.

German reference 1,047,032 shows a trailer with wheels that can be shifted backwardly before being lifted to an aft position. It is unclear whether this reference reveals mechanical structure that operates effectively and efficiently.

SUMMARY OF THE INVENTION

In accordance with the illustrative embodiments demonstrating features and advantages of the present invention, there is provided a carrier for transporting goods with a compartment having an underside. The compartment is adapted to hold such goods. The carrier has a crane peripherally mounted near the underside of the compartment for articulating about a pivot axis, between an upright position and a level position. Also included is a carriage having a plurality of wheels and adapted to slide under the compartment and on the crane. The carrier has an actuation means for: (a) sliding the carriage between the compartment and the crane; and (b) hoisting and lowering the carriage with the crane.

In accordance with a related method of the same invention, goods can be transported by employing a carriage with wheels and a crane pivotally mounted on a compartment. The method includes the step of lowering the crane to a level position. Another step is sliding the carriage from underneath the compartment to a position suspended on the crane. Another step is articulating the crane to an upright position to lift the carriage up against the compartment.

By employing apparatus and methods of the foregoing type, an improved carrier system is achieved. In the preferred embodiment, truck wheels are mounted on a pair of moveable beams. These beams slide on rollers on a pair of channels affixed to the underside of a compartment, such as a cargo container or trailer.

The preferred carriage also has a pair of crane rollers that need not engage any particular structure when the carriage is positioned underneath the compartment. However, the carriage can be hydraulically shifted backwards, so that the crane rollers can ride into channels on a crane mounted on the compartment.

In a preferred embodiment, the crane may be a parallel pair of channels that are pivotally mounted on the back of the compartment near the bottom edge. The cranes may be mounted at the bottom of recesses on opposite vertical edges of the compartment. Accordingly, the carriage can slid back so that the crane rollers on the carriage ride into the openings of the crane channels. Thereafter a hydraulic piston mounted in a vertical chamber behind the recess lifts the crane and carriage upward. Accordingly, the carriage is then stored flat against the back of the compartment with the crane fitting into the recesses in the back of the compartment.

After the wheels are thus placed in a stored position, the assembly can be shipped much like an ordinary container. When arriving at its destination the aforementioned steps can be reversed so that the carriage and its wheels may be repositioned underneath the compartment.

BRIEF DESCRIPTION OF THE DRAWINGS

The above brief description as well as other objects, features and advantages of the present invention will be more fully appreciated by reference to the following detailed description of presently preferred but nonetheless illustrative embodiments in accordance with the present invention when taken in conjunction with the accompanying drawings, wherein.

DETAILED DESCRIPTION OF PREFERRED EMBODIMENTS

Referring to FIGS. 1-6, a carrier is shown employing a compartment 10. Compartment 10 may be much like the compartment of a cargo container or trailer, as conventionally used in the trucking industry, except for the specific unique details described hereinafter. The compartment 10 may have (but not necessarily) overall dimensions similar to that known in the industry. Also, compartment 10 may have rear doors for loading compartment 10 in the usual fashion.

Affixed to the underside of compartment 10 are a pair of parallel fixed beams, shown as fixed channels 12 whose openings face each other. The fixed channels 12 are mounted parallel and symmetrically about the center of compartment 10. A carriage 14 is shown employing a number of truck wheels 16 mounted on axles 18. Axles 18 are supported by a spaced, parallel pair of movable beams 20 and 22. Beams 20 and 22 are shown as box beams, although I beams and other structure can be employed instead. Similarly, the number of wheels on carriage 14 can be varied, depending on the expected weight, the desired smoothness of ride etc. A rotatably mounted atop the beam 20 is an aft roller 24 and a forward roller 26. Similarly, movable beam 22 has an aft roller 28 and a forward roller 30. Rollers 24–30 are designed to roll inside fixed channels 12, thereby providing stable support for carriage 14. Forward rollers 26 and 30 are positioned more inboard than aft rollers 24 and 28. Because aft rollers 26 and 30 are so positioned, they are prevented from leaving fixed channel 12 by hitting stops 32. Forward rollers 24 and 28, however, will clear stops 32 and can exit through aft openings 34).

Mounted centrally on the outside of moveable beams 20 and 22 are a pair of support blocks 36 and 38, respectively. Journalled on blocks 36 and 38 are a pair of crane rollers 40 and 42, respectively. Rollers 40 and 42 extend laterally to the outside of moveable beams 20 and 22 to provide additional clearance for the cranes, shown herein as a spaced pair of a articulating channels 44. The channels 44 are parallel, mirror images, and have channel openings facing each other. Crane channel 44 is shown pivotally mounted on a dependent flange 46 that is part of the side face of compartment 10. Flange 46 keeps the pivot axis at axle 48 at the same elevation as fixed channel 12.

Crane rollers 40 and 42 are shown positioned to move underneath the compartment and slide into the opening at the proximal end of crane channels 44. While the outer ends of cranes channel 44 are shown open, in some embodiments they may be closed to prevent crane rollers 40 and 42 from leaving the crane channel 44. However, stops 32 on fixed channels 12 serve as an alternate means of preventing the crane rollers from traveling too far and leaving crane channels 44.

Crane channel 44 is shown coplanar with a vertical recess 50. Accordingly, crane 44 can pivot on the axis of axle 48 and fit into recess 50. This provides for compact storage for crane 44 for the purpose described hereinafter. The proximal end of crane channel 44 is shown with its top surface removed to provide additional clearance when the crane channel 44 swings into the recess 50.

The distal end of crane 44 is shown pivotally connected to the distal end of arm 52. Arm 52 fits through a vertical slot 58 that communicates between recess 50 and vertical chamber 56. The proximal end of arm 52 is coaxially mounted on lift rollers 54. Lift rollers 54 are mounted inside a vertical chamber 56. Lift arm 52 may be mounted on a common axle 57 (FIG. 4) with lift rollers 54. The lift arm 52 can be straddled by a cleavis 60 which is mounted on the distal end of a piston rod 62 which is part of a lift cylinder (hereinafter referred to as a lift means, which is part of an actuation means). Lift cylinder 64 may have multiple telescopic stages so that its extension distance is greater than the length of the cylinder itself. Also, instead of a hydraulic cylinder, various electric motors, ratchets, pulleys and cables may be used to move arm 52.

Another hydraulic cylinder 66 (FIGS. 1 and 2) has a piston arm 68 that connects to a brace 70 that spans between moveable beams 20 and 22. (Cylinder 66 is referred to as a shuttle means, also part of the actuation means). As described hereinafter, cylinder 66 can cause carriage 14 to move from underneath compartment 10 to a position suspended on the crane channels 44.

Figure 8:
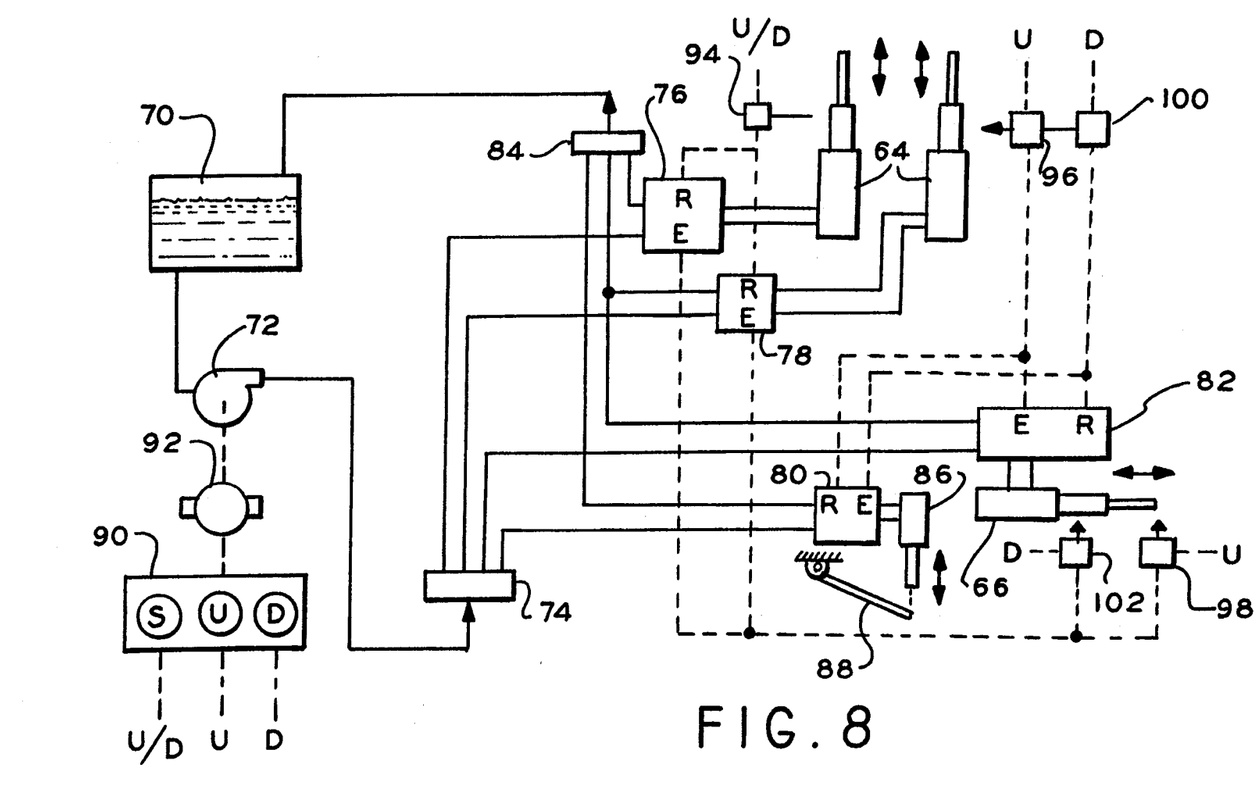
FIG. 8 is a schematic diagram of an actuation means for operating the carrier of FIG. 1.

Referring to FIG. 8, the illustrated control means is part of the previously mentioned actuation means. This system includes a tank 70 of hydraulic fluid that is pumped through pump 72 to a high pressure manifold 74. This manifold feeds the high pressure inlet of a number of hydraulic valves 76, 78, 80 and 82. The low pressure returns of valve 76–82 are connected to a return manifold 84 which returns to the tank 70. Hydraulic valves 76 and 78 connect to the pressure lines of hydraulic cylinders 64, which were described previously. Valve 82 connects to and controls previously mentioned shuttle cylinder 66.

Valve 80 connects to and controls another hydraulic cylinder 86, herein referred to as a deployment means. Cylinder 86 connects to a front support 88 which is the typical front support used to hold a trailer up when the truck tractor is removed. Cylinder 86 can be used to extend or retract the front support 88.

Valves 76–82 are solenoid actuated valves that can be operated by signals applied to terminals R and E. Essentially, a signal applied to terminal R will cause the associated hydraulic cylinder to retract while a signal applied to terminal E will reverse the hydraulic flow and cause the hydraulic cylinder to extend.

A control panel 90 is shown with push buttons S, U, and D. Push button S is intended start the system; push button U is intended to move the carriage to the up position; and push button D is intended to move the carriage to the down position. When the start button S is depressed, electric motor 92 is energized to start hydraulic pump 72, to provide pressure on manifold 74.

When the up push button U is pressed, a signal is supplied on line U/D, which connects to motion sensor 94. Motion sensor 94 responds to this input on line U/D by transferring this signal to terminals R of valves 76 and 78, because sensor 94 is normally closed when cylinders 64 are not in the fully retracted position. The up push button U of panel 90 also provides a signal on line U, which connects to the input of motion sensors 96 and 98. Alternatively, depression of the down button D of panel 90 produces a signal on line D, which connects to the input of motion sensors 100 and 102. Sensors 96 and 100 are referred to herein as a crane sensor means for producing a ready signal. Sensors 98 and 102 are referred to herein as a shuttle sensor means.

Because line U is energized, when cylinders 64 are fully retracted, sensor 96 applies a ready signal to terminal E of valve 82 and the R terminal of valve 80.

Similarly, sensor 100 applies a ready signal to the R terminal of valve 82 and the E terminal of valve 80 when cylinders 64 are fully retracted and line D is energized.

The outputs of sensors 98 and 102 are commonly connected to both terminals E of valves 76 and 78. Sensor 98 produces an arrival signal when line U is energized and cylinder 66 is fully extended. Sensor 102 produces an arrival signal when cylinder 66 is fully retracted and line D is activated.

Figure 5:
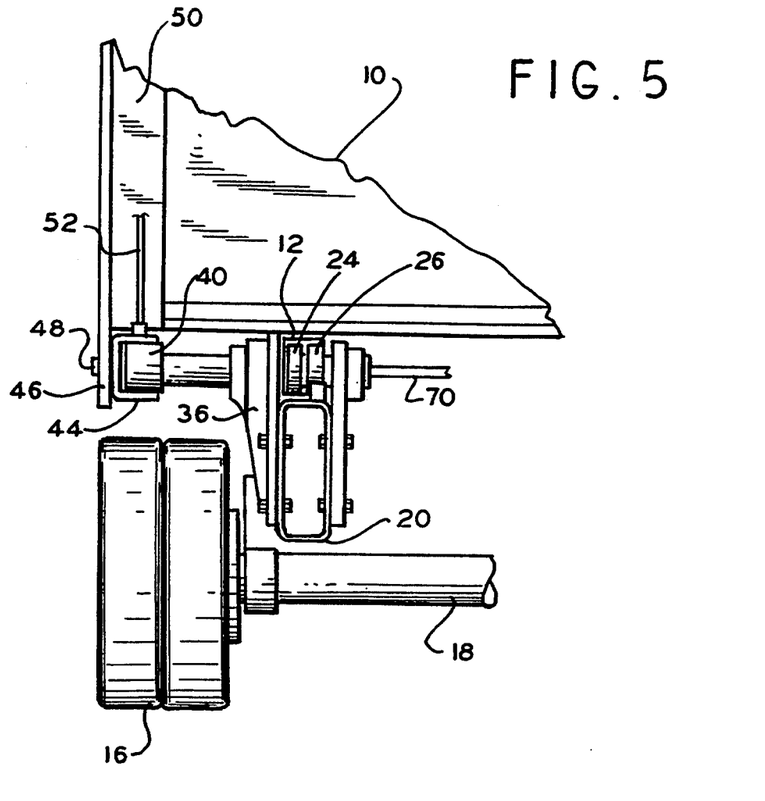
FIG. 5 is an end view of a portion of the carrier of FIG. 3.
Figure 6:
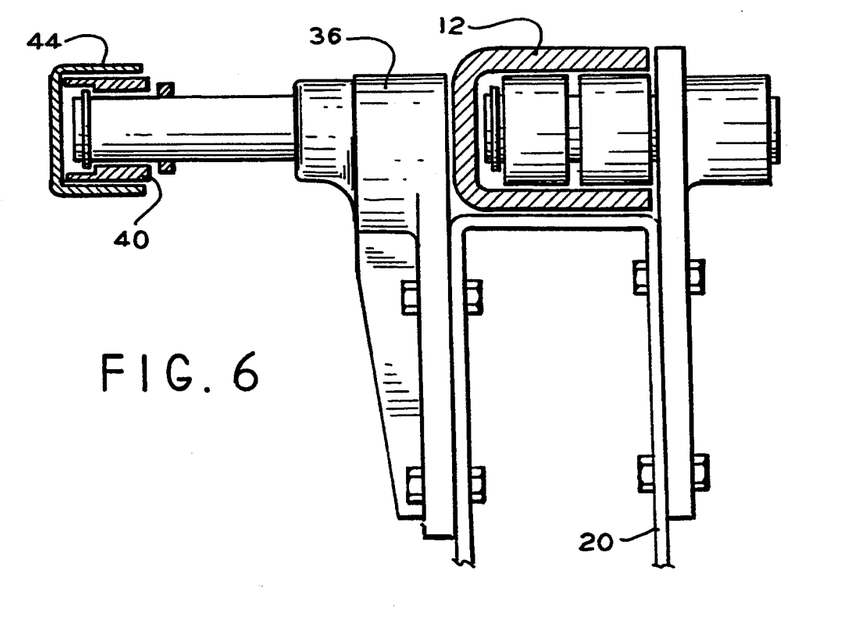
FIG. 6 is a detailed view of the moveable beam and associated apparatus shown in FIG. 5.
Figure 7A:
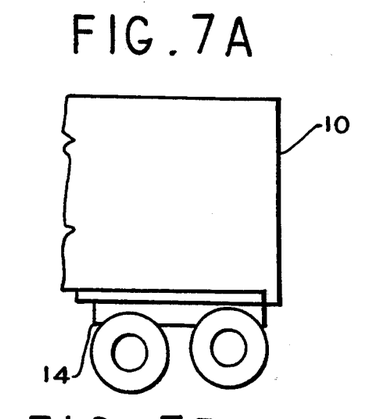
FIGS. 7A, 7B, 7C and 7D are simplified schematic diagrams showing the successive stages of operation of the carrier of FIG. 1.

To facilitate an understanding of the principles associated with the foregoing apparatus its operation will be briefly described in connection with the foregoing Figures as well as FIGS. 7A–7D. FIG. 7A shows the carriage 14 deployed underneath the compartment 10. This deployed condition is the one normally existing when the compartment 10 is to be used as a trailer with a conventional truck tractor. Under these circumstances, forward and aft rollers 24 and 26 are mounted within fixed channel 12 as illustrated in FIG. 5. At this time, the crane channel 44 shown in FIG. 3 will be free of the carriage and will be swung upwardly into recess 50. Hydraulic cylinder 66 (shown in FIG. 2, only extended not retracted) will be locked in a retracted position to keep carriage 14 from moving longitudinally. Alternatively, various locking pins or other clamping devices can be used to keep carriage 14 in a fixed position.

When the carrier is to be loaded, for example onto a cargo ship, the carrier is hoisted slightly upwardly slightly. The hydraulic system of FIG. 8 can then be started by pushing start button S on panel 90 (FIG. 8). Thereafter, motor 92 is starts and pump 92 applies hydraulic pressure to manifold 74. Next, when up button U is depressed, a signal is provided on lines U/D and U. The signal on line U/D passes through position sensor 94 to terminals R of valves 76 and 78. Consequently, lift cylinders 64 begin to retract.

Figures 1, 3:
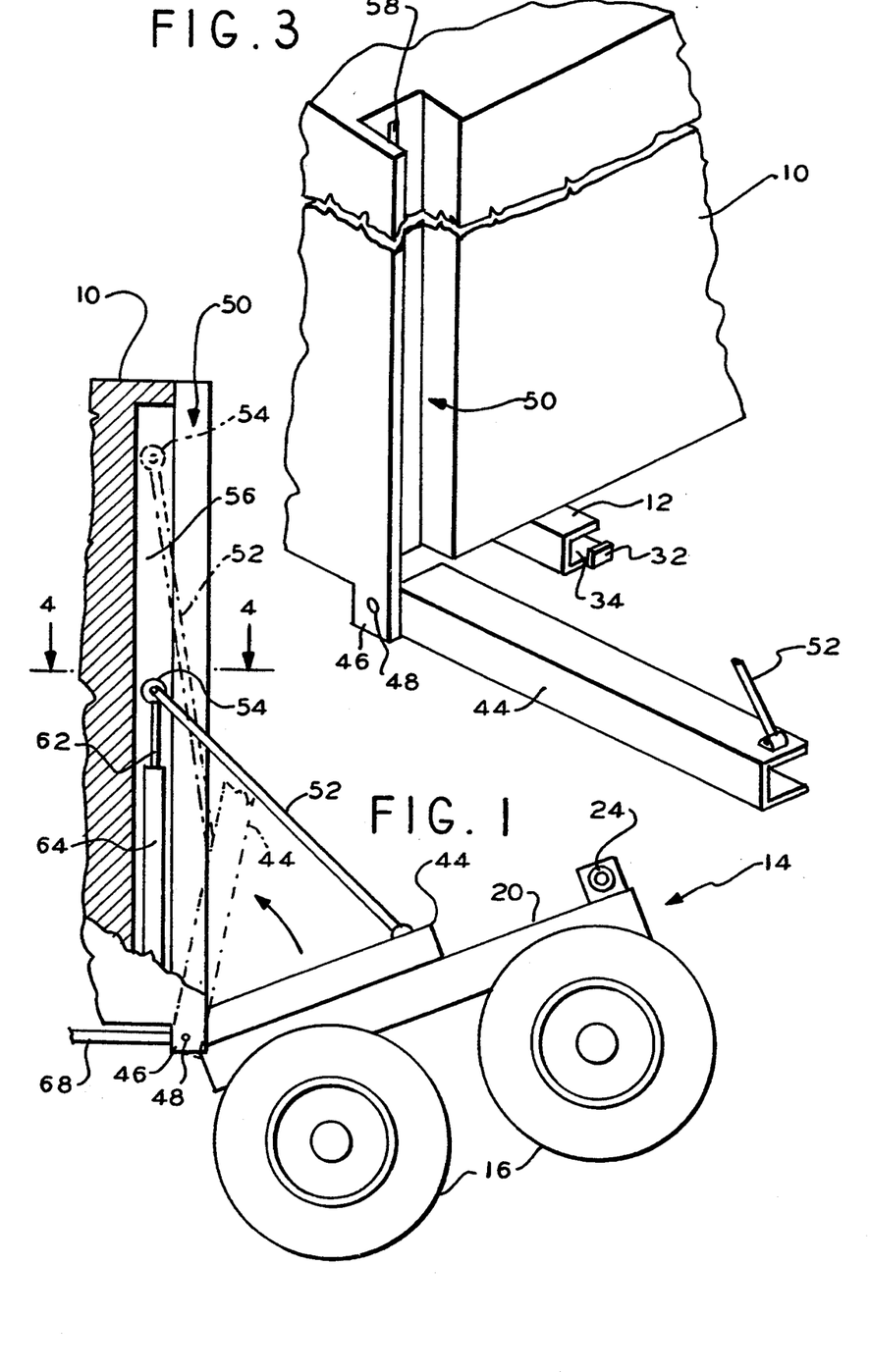
FIG. 1 is a partial elevational view, partly section, of a carrier in accordance with the principles of the present invention, showing a crane in a partially lifted position to lift the illustrated carriage.
FIG. 3 is an axonometric view of the carrier FIG. 1 with portions broken away for the sake of simplicity.
Figure 2:
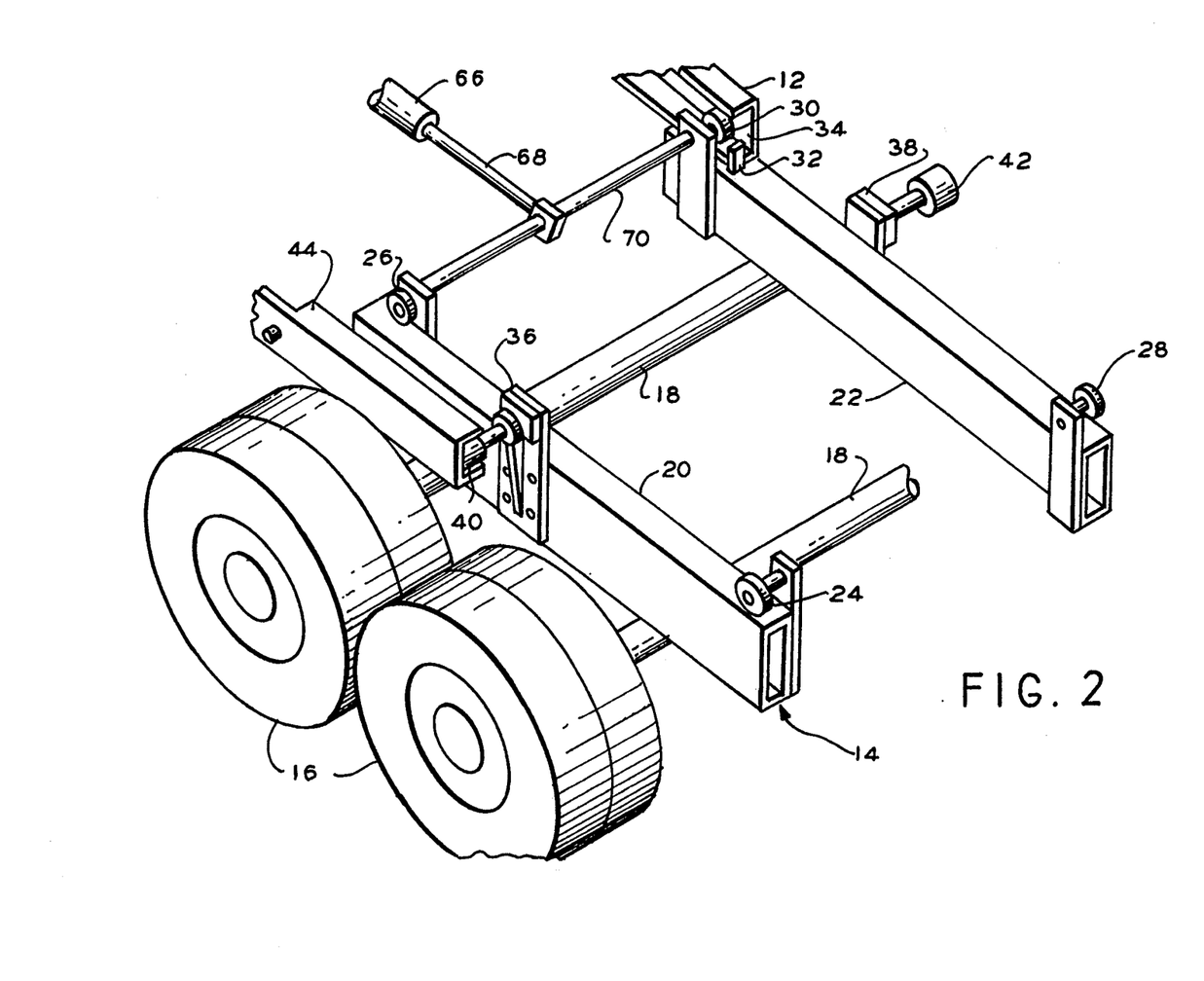
FIG. 2 is an axonometric view of a carriage (simplified by having portions broken away) showing portions of a crane, a fixed beam and actuation means.
Figure 4:
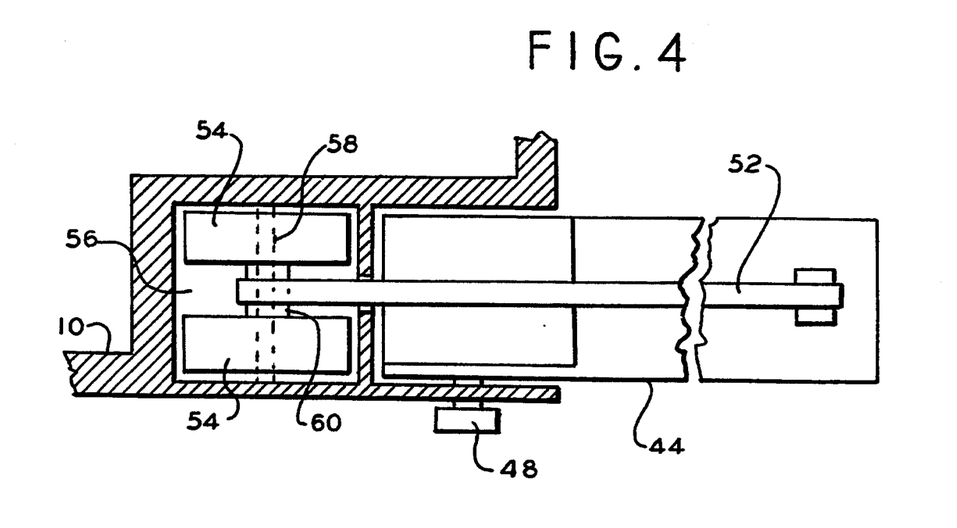
FIG. 4 is a cross-sectional view taken along the line 4—4 of FIG. 1.
Figure 7B:
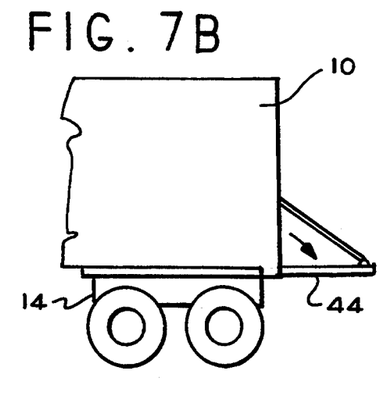

Referring to FIG. 1, motion of crane channel 44 is depicted (This Figure shows carriage 14 on the crane, but the carriage is more properly shown positioned under compartment 10 in FIGS. 7A and 7B). Re-traction of cylinder 64 causes roller 54 to descend from an uppermost position into a lower position. As illustrated, arm 52 descends to lower crane channel 44. Consequently, crane channel 44 eventually reaches a level or horizontal position, as shown in FIG. 7B.

With cylinders 64 fully retracted, sensor 96 (FIG. 8) is activated to apply a ready signal to terminal E of valve 82 and terminal R of valve 80. As a result, cylinder 66 will extend while cylinder 86 will retract. Retraction of cylinder 86 will lift the front support 88 in the usual fashion.

Extension of cylinder 66 causes piston rods 68 to push carriage 14 forward. (See FIGS. 7C and 2.) Rollers 24–30 ride in fixed channels 12. Next, rollers 28 move out of channels 12 through openings 30, missing stops 32. After leaving channels 12, rollers 24 and 28 have no further effect on the process (until these steps are reversed).

Next crane rollers 40 and 42 reach the proximal end of crane channels 44. FIG. 3 shows crane channel 44 down and awaiting the crane rollers. Crane rollers then roll within the crane channels 44, eventually reaching the position shown in FIG. 2. At this time forward rollers 26 and 30 reach stops 32 at the aft end of channels 12 and can go no further. Thus carriage 14 has reached the position illustrated in FIG. 7C.

After reaching this position, sensor 98 (FIG. 8) applies an arrival signal to terminals E of valves 76 and 78. Consequently, pressure to cylinders 64 is reversed and these cylinders now extend. As illustrated in FIG. 1, the extension of piston rod 62 lifts rollers 54 and pulls arm 52. As a result crane channel 44 lifts carriage 14 as shown in FIG. 1. At this time forward rollers 26 and 30 act as a fulcrum around which carriage 14 swings, while crane 44 provides the motive force. Eventually, carriage 14 reaches the position shown in FIG. 7D.

Once carriage 14 is brought flat against the back of compartment 10, hydraulic pump 92 of FIG. 8 can be deactivated. Thereafter, carriage 14 can be secured in place by appropriate pins, clamps or other locking mechanisms. Now the compartment 10 can be lifted by a hoist or other means onto a cargo ship or other conveyance.

Figure 7C:
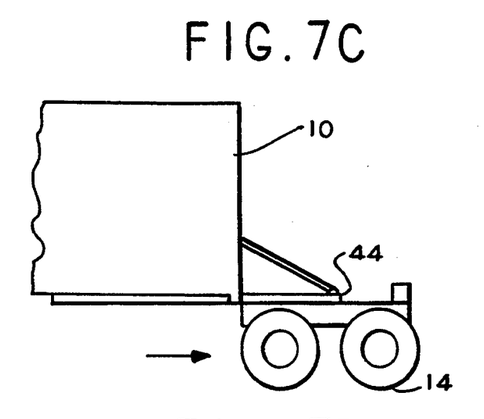
Figure 7D:
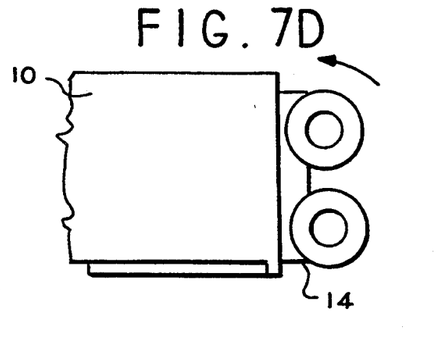

It will be appreciated that the foregoing steps can be reversed to proceed from FIG. 7D to FIGS. 7C, 7B and then 7A. Referring to FIG. 8, this reversed sequence is accomplished by again depressing start button S on panel 90 to energize motor 92 and pump 72. When down button D is depressed, lines U/D and D are activated. Consequently, sensor 94 applies a signal to terminal R of valves 76 and 78 to retract cylinders 64. This causes the crane channels 44 to swing from the retracted position of Figure of 7D to the position shown in FIG. 7C. Once retracted, motion sensor 100 transfers the signal on line D to the R terminal of valve 82 and the E terminal of valve 80. Consequently, deployment cylinder 86 extends to deploy the front support 88, while shuttle cylinder 66 retracts. The retraction of shuttle cylinder 66 pulls carriage 14 from the position, shown in FIG. 7C to that shown in FIG. 7B. Once the cylinder 66 is fully retracted, sensor 102 (FIG. 8) applies an arrival signal to terminals E of valves 76 and 78. Consequently, lift cylinder 64 extends to swing the crane channels from the position shown in FIG. 7B to that shown in FIG. 7A.

It is to be appreciated that various modifications may be implemented with respect to the above described preferred embodiments. While a pair of articulating crane channels are shown, in some embodiments a greater or lesser number may be used instead. Also while a channel is shown, in some embodiments the carriage may held onto the crane by other means such as separate clamps or fasteners. Also while the aft crane rollers are shown at a different lateral positions than the forward crane rollers, in some embodiments they may be at the same lateral position. Indeed in some embodiments, the aft roller may serve the same function as the crane roller. Moreover, while hydraulic cylinders are shown, in some embodiments worm gear drives, lead screws, ratcheting mechanisms, chains, pulleys or similar mechanisms can be used to move the carriage horizontally and to articulate the crane. Also while the forward roller is shown as a fulcrum point for the carriage, in some embodiments the carriage may be shifted backwardly to engage a grasping mechanism, which then forms an independent fulcrum. Alternatively, in some embodiments the crane itself may form the only fulcrum point, depending upon the arrangement of the mechanism and rollers that attach the carriage to the crane. Furthermore, in some embodiments a front support may not be used or, if used, need not be automatically retracted and deployed. While a recess is shown for the crane, such a recess may not be employed in other embodiments. The various dimensions of the mechanisms and the overall dimensions of the compartment may be varied depending upon the load capacity, desired structural rigidity etc.

Obviously, many modifications and variations of the present invention are possible in light of the above teachings. It is therefor to be understood that within the scope of the appended claims, the invention may be practiced otherwise than as specifically described.

I claim:

1. A carrier for transporting goods comprising:
   a compartment having an underside and adapted to hold said goods;
   a crane peripherally mounted near the underside of said compartment for articulating about a pivot axis between an upright position and a level position;
   a carriage having a plurality of wheels and adapted to slide under said compartment and on said crane, said crane being adapted to: (a) engage and articulate with said carriage, and (b) disengage and articulate independently of said carriage; and
   actuation means for: (a) sliding said carriage between said compartment and said crane, and (b) hoisting and lowering said carriage with said crane.

2. A carrier according to claim 1 comprising:
   a fixed beam affixed to the underside of said compartment for releasably connecting said carriage to the underside of said compartment.

3. A carrier according to claim 2 wherein said fixed beam extends beyond said compartment to allow clearance for said carriage to swing upwardly and away from the underside of said compartment.

4. A carrier according to claim 3 wherein said fixed beam is substantially perpendicular to said pivot axis of said crane.

5. A carrier according to claim 4 wherein said fixed beam and said crane, relative to said pivot axis, are spaced from each other.

6. A carrier according to claim 5 wherein said fixed beam comprises: a spaced, parallel pair of fixed channels mounted to the underside of said compartment perpendicular to said pivot axis.

7. A carrier according to claim 6 wherein said crane comprises: a spaced, parallel pair of articulating channels peripherally mounted near the underside of said compartment for articulating about the pivot axis.

8. A carrier according to claim 7 wherein said articulating channels straddle said fixed channels.

9. A carrier according to claim 1 wherein said carriage is longer than said crane.

10. A carrier according to claim 9 wherein said carriage is about twice as long as said crane.

11. A carrier according to claim 1 wherein said carriage comprises: a moveable beam; and at least one crane roller adapted to roll onto said crane for releasably attaching said moveable beam to said crane.

12. A carrier according to claim 1 wherein said crane comprises: a spaced, parallel pair of articulating channels peripherally mounted near the underside of said compartment for articulating about the pivot axis, said carriage comprising:
   a parallel, spaced pair of moveable beams; and
   a spaced, coaxial pair of crane rollers adapted to roll onto different, corresponding ones of said articulating channels for detachably securing said moveable beams to said crane.

13. A carrier according to claim 2 wherein said carriage comprises:
   a moveable beam; and
   at least one support roller rotatably mounted on said moveable beam and adapted to roll on said fixed beam.

14. A carrier according to claim 3 wherein said carriage comprises:
   a moveable beam; and
   a forward roller and an aft roller rotatably mounted on said moveable beam and adapted to roll on said fixed beam.

15. A carrier according to claim 14 wherein said forward and aft rollers, only said aft roller is adapted to leave said fixed beam.

16. A carrier according to claim 14 wherein said forward and aft rollers are axially spaced, said fixed beam having an aft opening positioned to pass said aft roller and stop said forward roller, said aft roller upon stopping at said aft opening being operable as a fulcrum for said carriage.

17. A carrier according to claim 1 wherein said actuation means comprises:
   an arm pivotally attached distally to said crane; and
   lift means for pulling said arm up and articulating said crane.

18. A carrier according to claim 17 wherein said compartment has a vertical chamber containing said lift means.

19. A carrier according to claim 18 wherein said compartment has adjacent to said vertical chamber a vertical recess positioned and sized to receive said crane.

20. A carrier according to claim 19 wherein said lift means comprises:
   a lift cylinder having a piston rod and mounted in said vertical chamber, said vertical chamber having a slot opening onto said recess, said arm being connected between said piston rod and said crane and being positioned in said slot.

21. A carrier according to claim 20 wherein said lift means comprises:
   a lift roller attached at the junction of said arm and said piston rod.

22. A carrier according to claim 17 wherein said actuation means comprises:
   shuttle means for moving said carriage.

23. A carrier according to claim 22 wherein said actuation means comprises:
   control means coupled to said lift means and said shuttle means and being operable to release said lift means to lower said crane; and
   crane sensor means coupled to said control means for providing thereto a ready signal in response to said crane being lowered, said control means being operable in response to said ready signal to operate said shuttle means and move said carriage.

24. A carrier according to claim 23 wherein said actuation means comprises:

shuttle sensor means coupled to said control means for providing thereto an arrival signal in response to said carriage arriving at a destination pressed by said shuttle means, said control means being operable in response to said arrival signal to operate said lift means and hoist said crane.

25. A carrier according to claim 23 wherein said actuation means comprises:

a front support pivotally mounted on the underside of said compartment; and deployment means coupled to said front support for retracting and deploying it when said carriage is moved on and off said crane, respectively.

26. A method for transporting goods employing a carriage with wheels and a crane pivotally mounted on a compartment, said method comprising the steps of:

lowering said crane to a level position;

sliding said carriage from underneath said compartment to a position suspended on said crane; and articulating said crane to an upright position to lift said carriage up against said compartment.

27. A method according to claim 26 comprising the steps of: articulating said crane to a level position to lower said carriage; moving said carriage from said crane to underneath said compartment; and articulating said crane to an upright position.

28. A method according to claim 27 comprising the step of: supporting said compartment independently of said carriage when said carriage is being moved relative to said compartment.

29. A carrier for transporting goods comprising:

a compartment having an underside and adapted to hold said goods;

a crane peripherally mounted near the underside of said compartment for articulating about a pivot axis between an upright position and a level position;

a carriage having a plurality of wheels and adapted to slide under said compartment and on said crane, said carriage being longer than said crane; and actuation means for: (a) sliding said carriage between said compartment and said crane, and (b) hoisting and lowering said carriage with said crane.

* * * * *